(12) United States Patent
Xi et al.

(10) Patent No.: US 10,382,498 B2
(45) Date of Patent: Aug. 13, 2019

(54) CONTROLLING AGGREGATION OF SHARED CONTENT FROM MULTIPLE ENDPOINTS DURING AN ONLINE CONFERENCE SESSION

(71) Applicant: Cisco Technology, Inc., San Jose, CA (US)

(72) Inventors: Yasi Xi, Hefei (CN); Jimmy Li, Hefei (CN); Mingfeng Yang, Hefei (CN); Shun Wang, Hefei (CN)

(73) Assignee: Cisco Technology, Inc., San Jose, CA (US)

(*) Notice: Subject to any disclaimer, the term of this patent is extended or adjusted under 35 U.S.C. 154(b) by 185 days.

(21) Appl. No.: 15/045,817

(22) Filed: Feb. 17, 2016

(65) Prior Publication Data

US 2017/0237788 A1    Aug. 17, 2017

(51) Int. Cl.
*G06F 15/16* (2006.01)
*H04L 29/06* (2006.01)
(Continued)

(52) U.S. Cl.
CPC ........ *H04L 65/4015* (2013.01); *G06F 3/1454* (2013.01); *G09G 5/14* (2013.01); *H04L 65/1089* (2013.01); *H04L 65/403* (2013.01); *H04L 65/4038* (2013.01); *H04N 7/152* (2013.01); *G09G 2354/00* (2013.01)

(58) Field of Classification Search
CPC ............... H04L 65/4015; H04L 65/403; H04L 65/4038; H04L 65/1089; G06F 3/1454
See application file for complete search history.

(56) References Cited

U.S. PATENT DOCUMENTS

| 5,822,525 | A | * | 10/1998 | Tafoya | ................ H04L 12/1813 370/200 |
| 6,074,216 | A | * | 6/2000 | Cueto | ...................... G09B 5/14 434/118 |

(Continued)

OTHER PUBLICATIONS

Cisco, WebEx Meeting Center User Guide, Cisco Webex, 1997-2013, 414 pages.*

(Continued)

*Primary Examiner* — Richard G Keehn
(74) *Attorney, Agent, or Firm* — Edell, Shapiro & Finnan, LLC

(57) ABSTRACT

Controlling aggregation of shared content from multiple presenters during an online conference session includes, at a server having network connectivity, at a server having network connectivity, identifying a master presenter at an endpoint among a plurality of endpoints participating in an online conference session in which at least one of the plurality of endpoints is sharing content with other participants among the plurality of participants at their respective endpoints. One or more assistant presenters are determined among the plurality of participants at their respective endpoints. A master user interface is generated to serve as the user interface on the endpoint of the master presenter and a command is received, via the master user interface, to designate a layout. The layout aggregates shared content from the endpoints of one or more of the assistant presenters to make the layout viewable at the plurality of endpoints.

20 Claims, 7 Drawing Sheets

(51) Int. Cl.
*G06F 3/14* (2006.01)
*G09G 5/14* (2006.01)
*H04N 7/15* (2006.01)

(56) References Cited

U.S. PATENT DOCUMENTS

| | | | |
|---|---|---|---|
| 6,084,590 A * | 7/2000 | Robotham | G06T 13/00 |
| | | | 345/419 |
| 6,356,905 B1 * | 3/2002 | Gershman | G06F 17/30899 |
| | | | 705/26.8 |
| 7,669,141 B1 * | 2/2010 | Pegg | G06F 9/451 |
| | | | 715/781 |
| 8,091,029 B1 | 1/2012 | Gay et al. | |
| 8,693,648 B1 * | 4/2014 | Drugge | G06Q 50/01 |
| | | | 348/14.08 |
| 2005/0069225 A1 * | 3/2005 | Schneider | H04N 21/23431 |
| | | | 382/305 |
| 2005/0071736 A1 * | 3/2005 | Schneider | G06F 17/30029 |
| | | | 715/201 |
| 2006/0161622 A1 | 7/2006 | Montgomery et al. | |
| 2008/0091778 A1 * | 4/2008 | Ivashin | G06Q 10/10 |
| | | | 709/204 |
| 2010/0185733 A1 * | 7/2010 | Hon | G06F 17/30029 |
| | | | 709/205 |
| 2011/0197263 A1 * | 8/2011 | Stinson, III | G06F 3/011 |
| | | | 726/4 |
| 2014/0033058 A1 | 1/2014 | Perotti | |
| 2015/0326824 A1 | 11/2015 | Midtskogen Berger et al. | |
| 2016/0021147 A1 * | 1/2016 | Osmond | H04L 65/1016 |
| | | | 370/312 |

OTHER PUBLICATIONS

A. Romanow et al., "Use Cases for Telepresence Multi-streams—draft-ietf-clue-telepresence-use-cases-09.txt", CLUE WG, Internet—Draft, Feb. 5, 2014, 17 pages.

"Airserver—The Classroom in your hands", http://www.airserver.com/Usage/Education#allfeatures . . . , 2011-2016 App Dynamic ehf., downloaded from the internet on Feb. 17, 2016, 5 pages.

* cited by examiner

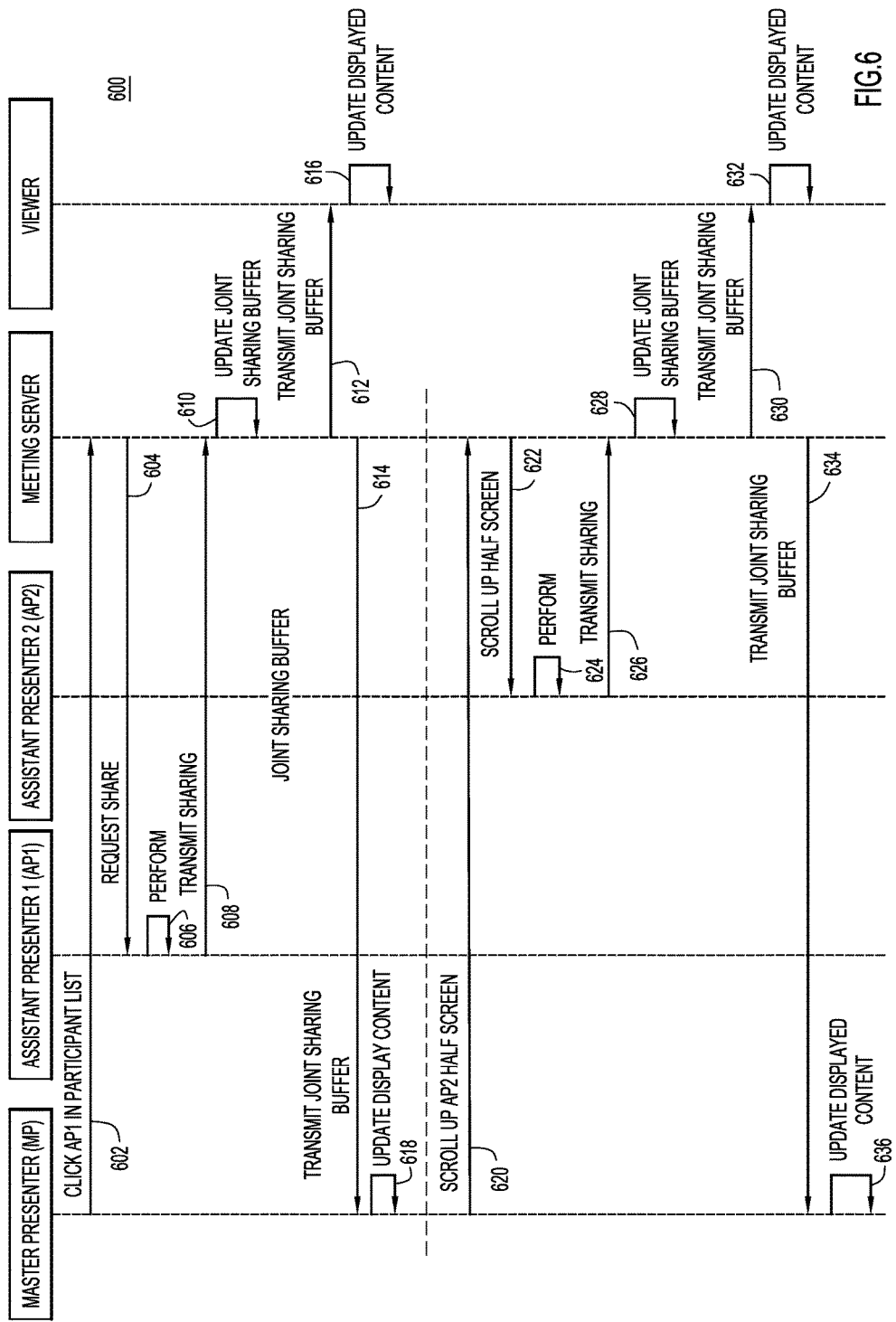

CONTROLLING AGGREGATION OF SHARED CONTENT FROM MULTIPLE ENDPOINTS DURING AN ONLINE CONFERENCE SESSION

TECHNICAL FIELD

The present disclosure relates to collaboration systems and, more particularly, to online conference systems.

BACKGROUND

Online conference systems, sometimes referred to as video conference, web conference, teleconferencing, telepresence, or more generally collaboration systems, allow persons or groups of people at different locations to communicate by at least simultaneous two-way content and audio transmissions during meetings. For example, online conference systems may allow participants in a session (e.g., a meeting) to converse audibly while sharing desktops, presentations, and/or other such content or materials during the session. In some instances, online conference systems may also allow two-way video transmissions.

In some online conference sessions, participants may want to share content from multiple endpoints (e.g., devices) simultaneously. For example, if two participants in an online conference session are attempting to demonstrate a new file-sharing product, a first participant may act as a file sender and a second participant may act as a file receiver. In order to provide an accurate description of the file sharing process, the content shown on the device of the first participant (the file sender) and the content shown on the device of the second participant (the file receiver) should be simultaneously shared with any other participants from the online conference session.

BRIEF DESCRIPTION OF THE DRAWINGS

FIG. 6 is a sequence diagram, depicting operations associated with controlling, at a server application, aggregation of shared content from multiple participants of an online conference session, according to an example embodiment.

DESCRIPTION OF EXAMPLE EMBODIMENTS

Overview

Figure 1:
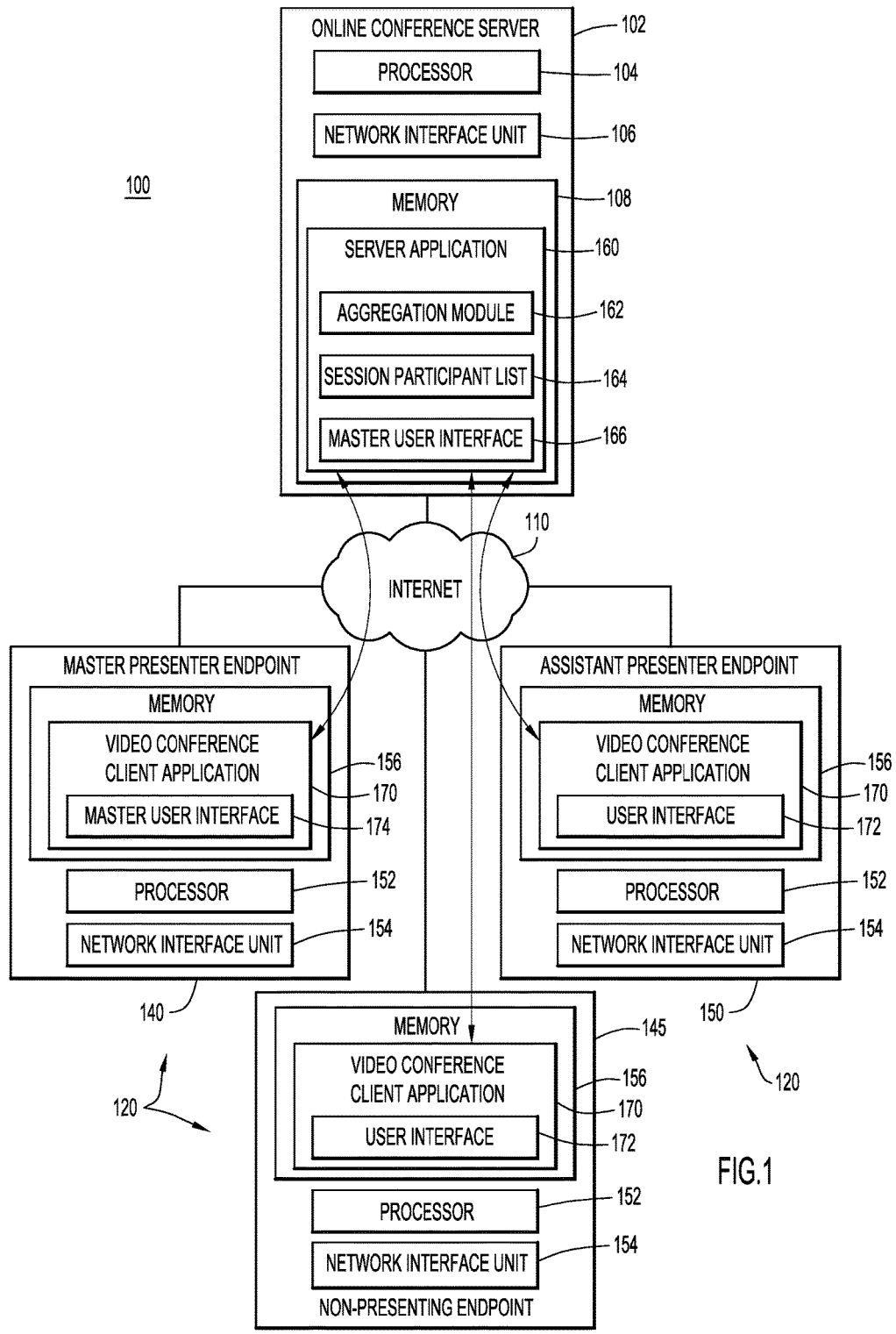
FIG. 1 is a block diagram of an online conference environment in which shared content aggregation processes may be controlled, according to an example embodiment.

Techniques are provided herein for controlling aggregation of content shared from multiple endpoints (e.g., by multiple presenters) during an online conference session. These techniques may be embodied as a method, an apparatus, a system, and instructions in a computer-readable storage media to perform the method.

According to at least one example embodiment, techniques are provided for controlling aggregation of shared content from multiple endpoints during an online conference session. At a server having network connectivity, a master presenter is identified at an endpoint among a plurality of endpoints participating in an online conference session in which at least one of the plurality of endpoints is sharing content with other participants among the plurality of participants at their respective endpoints. One or more assistant presenters are determined among the plurality of participants at their respective endpoints. A master user interface is generated to serve as the user interface on the endpoint of the master presenter and a command is received, via the master user interface, to designate a layout. The layout aggregates shared content from the endpoints of one or more of the assistant presenters to make the layout viewable at the plurality of endpoints.

Example Embodiments

Presented herein are techniques for controlling aggregation of shared content from multiple endpoints during online conference session. Generally, these techniques allow multiple participants in an online conference session to simultaneously present content from their respective endpoints (e.g., multiple desktops may be shared at once). Consequently, participants in the online conference session may view a combination of content from multiple endpoints, such as one or more remote desktops and/or remote applications. However, as the amount of devices sharing content increases, it may become increasingly difficult to organize the shared content. Consequently, the techniques presented herein also identify a master presenter among the endpoints participating in the online conference session and provide the endpoint identified as the master presenter with a master user interface. The master user interface enables the master presenter to easily and efficiently provide commands to a server managing the layout of shared content, such that the endpoint identified as the master presenter essentially acts as the coordinator of an online conference session. For example, the master user interface may provide controls that produce commands regarding the shape, size, orientation, location, etc. of any number of shared screens from any number of presenters. Moreover, the master user interface may provide controls that send commands to the server indicating which participants are allowed to share content over various durations/time portions of the online conference session (e.g., at the current moment or over the duration of the online conference session).

Although some techniques currently exist for sharing content from multiple devices, many of these techniques fail to provide simple and efficient organizational structures. For example, some techniques allow devices to share content on demand and simply divide the shared content into quadrants or sections based on the number of endpoints currently sharing content. These techniques do not provide a way to resize, reshape, relocate, or remove content to emphasize, organize, or otherwise manipulate share content. Consequently, shared content may be unorganized and difficult to see. Moreover, some techniques provide no control over which devices may share content. By comparison, the techniques presented herein are more flexible and secure.

Additionally, some current techniques for aggregating content from multiple devices are executed on a specific device. Thus, if a presenter's device is a tablet, phone, or some other device/endpoint with limited computing power, the aggregation may experience a bottleneck, causing errors in the conference session. Additionally or alternatively, some current techniques allow participants in an online conference session to simultaneously view content shared by multiple devices by transmitting content from each presenting device in a separate data stream. For example, if N participants share their desktop simultaneously, the N desktops are transmitted in N separate streams, not in a single stream. Although multiple data streams may allow each participant that is viewing the aggregated shared content to individually adjust the layout of the shared content, this type of transmission results in lower efficiency of data transmission and local rendering compared to a single data stream transmission. As is described in further detail below, the techniques presented herein aggregate or combine content from multiple devices at a server and the aggregated content is transmit (e.g., broadcast) to any viewing participants in a single data stream, thereby providing a simpler, more efficient topology architecture.

Reference is first made to FIG. 1, which illustrates a computing environment 100 for controlling aggregation of shared content from multiple endpoints during an online conference session. In the computing environment 100, an online conference server 102 communicates, via the Internet 110, with a plurality of endpoints 120 (which may also be referred to as computing devices). For simplicity, the plurality of endpoints 120 are illustrated as including a master presenter endpoint 140, a non-presenting endpoint 145, and an assistant presenter endpoint 150 in FIG. 1. However, in other embodiments, the plurality of endpoints 120 may include any number of endpoints/computing devices. The server 102 is also referred to herein as a meeting server.

The online conference server 102 includes a processor 104, a network interface unit 106, and a memory 108. The processor 104 is configured to execute instructions stored on memory 108 and the network interface unit 106 enables connectivity to the Internet 110. The online conference server 102 also includes a server application 160 that may reside on memory 108 and serves conference session support for online conference client applications 170 (also referred to herein as client applications 170, for simplicity) that may be installed on the plurality of endpoints 120 (i.e., downloaded via the Internet 110). Generally, the server application 160 is configured to direct online conference traffic flows between any online conference client applications 170 participating in an online conference session (illustrated in solid lines). Thus, once an online conference session is initiated, each client application 170 is operatively connected to the server application 160 such that any client applications 170 connected to the session are in communication with each other in an online conference session via the server application 160. The session may be established using any suitable protocols now known or hereinafter developed.

The server application 160 may include an aggregation module 162, a session participant list 164, and a master user interface 166. The aggregation module 162 is configured to receive and aggregate content shared by two or more of the plurality of endpoints 120. For example, the aggregation module 162 may organize shared content in accordance with commands received from the master user interface 166 once the master user interface 166 is provided to a master presenter, as is described in more detail below. Moreover, the aggregation module 162 is configured to transmit aggregated content to any endpoints participating in the online conference session in a single data stream. Notably, aggregating shared content at the server 102 and transmitting the shared content from the server 102 in a single data stream may substantially reduce computing bottlenecks that may arise when multiple streams are received and/or managed at a single endpoint. The session participant list 164 maintains a list of participants in a particular online conference session, such as by querying data objects that associate endpoints with specific participants.

Each of the plurality of endpoints 120 (e.g., the master presenter endpoint 140, the non-presenting endpoint 145, and the assistant presenter endpoint 150) includes a processor 152 configured to execute instructions stored in a memory 156 and a network interface unit 154 that provides connectivity to the Internet 110. For example, the processor 152 may be configured to execute instructions to install the client application 170, which may include a client user interface 172. The client user interface 172 may provide an interface for a participant (presenting or non-presenting) to view other participants participating in online conference session, as well as any content being shared or displayed during the online conference session. However, as depicted in the example embodiment of FIG. 1, once a master presenter is identified, the user interface 172 may be replaced, supplemented, augmented, modified, or otherwise updated to be a master user interface 174. Moreover, in some embodiments, the user interface 172 of non-presenting endpoints may differ from the user interface of assistant presenters. The specific interfaces provided to the various designated roles are described in further detail below.

Still referring to FIG. 1, each of the plurality of computing endpoints 120 may be any computing device/endpoint compatible to support the online conference client application 170. For example, endpoint 140 may be a tablet computer and endpoint 150 may be a smartphone, desktop, virtual machine, or any other device, provided that each of the plurality of endpoints includes or is associated with a processor 152 configured to support the online conference client application 170 and network equipment 154 configured to provide connect the device to the Internet 110, respectively. Additionally or alternatively, one or more of the endpoints may be embodied entirely as one or more software applications running on a computing device, such as in a cloud or data center environment. Thus, an endpoint may be a physical device or a software process.

Additionally, although each module described herein, such as the aggregation module 162, is shown stored in memory, such as memory 108, each module described herein may be implemented on hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by a processor can also refer to logic based-processing by the module that is initiated directly or indirectly by the processor to complete a process or obtain a result. Additionally or alternatively, each module can include memory hardware, such as at least a portion of a memory, for example, that includes instructions executable with a processor to implement one or more of the features of the module. When any one of the modules includes instructions stored in memory and executable with the processor, the module may or may not include a processor. In some examples, each module may include only memory storing instructions executable with the processor to implement the features of the corresponding module without the module including any other hardware.

Moreover, memory 108 and/or memory 156 may also be configured to store any messages, generated alerts, information related to alerts, user lists, instructions related to detecting a presenter, instructions related to detecting a content capture event, or any other data. Generally, memory 108 and/or memory 156 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 108 and/or memory 156 may be or include one or more tangible (non-transitory) computer readable storage media (e.g., a memory device) encoded with software comprising computer executable instructions. For example, memory 108 and/or memory 156 may store instructions that may be executed by processor 104 or processor 152, respectively, for performing the content capture process detection and reporting as described below with reference to the figures. In other words, memory 108 and/or memory 156 may include instructions, that when executed by one or more processors, cause the one or more processors to carry out the operations described below in connection with the figures.

Figure 2:
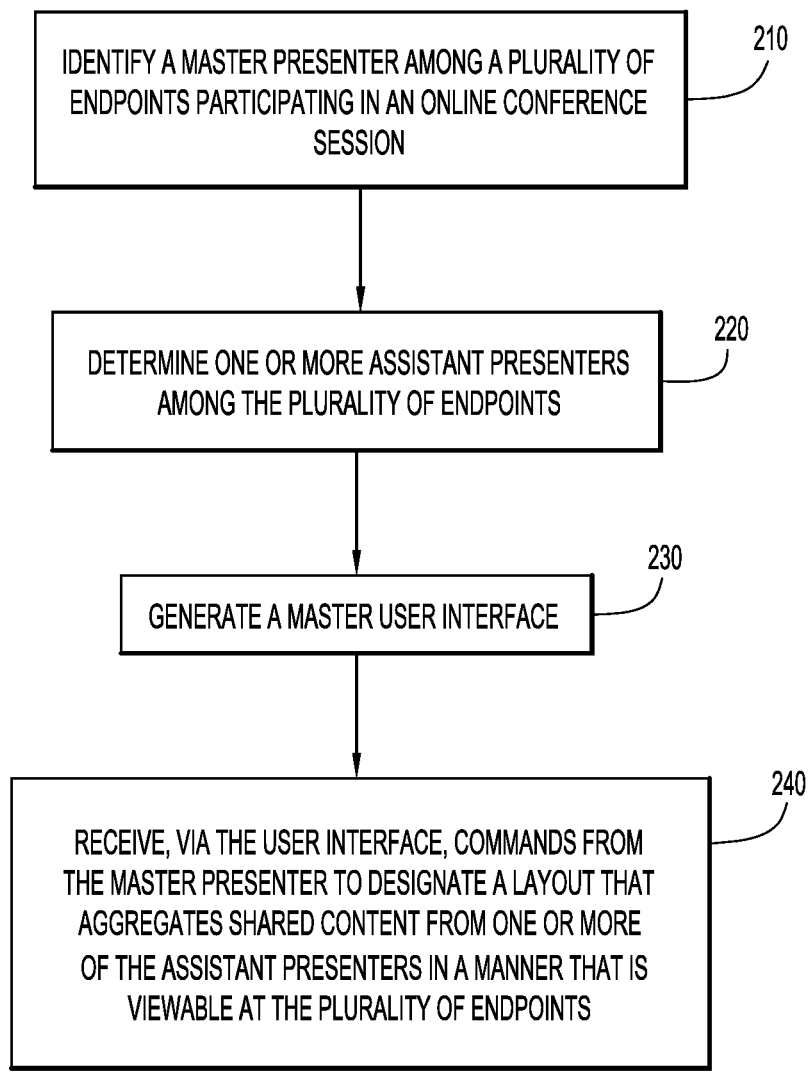
FIG. 2 is a high-level flowchart illustrating a process for controlling, at a server application, aggregation of shared content from multiple participants of an online conference session, according to an example embodiment.

Reference is now made to FIG. 2 (with continued reference to FIG. 1) for a high-level description of a method 200 for aggregating shared content from multiple endpoints during an online conference session, such as performed by execution of the software instructions included in the aggregation module 162. At step 210, a master presenter is identified among a plurality of endpoints participating in an online conference session. The online conference session may include two or more participants participating from two or more endpoints and, in some embodiments, upon establishing the online conference session, the server application 160 may automatically designate or assign one client application 170 as the master presenter. For example, the client application 170 "hosting" the session may be designated as the master presenter, at least initially. However, in other embodiments, the master presenter may be identified in any manner.

In some embodiments, the server application 160 may enable the endpoint identified or designated as the master presenter to share content that is accessible from his/her endpoint and/or currently displayed on the display of their endpoint. However, in other embodiments, the server application 160 may disable the endpoint designated as the master presenter from sharing content, such that the master presenter is essentially a coordinator of shared content from other participants (assistant presenters) in the online conference session. The master presenter may always be enabled to share audio during the online conference session and, thus, can talk during the session to describe the content being shared (e.g., the arrangement of shared content).

Moreover, in some embodiments, the participants may choose to change the master presenter (e.g., "pass the ball") during the online conference session so that different participants may control the aggregation of shared content during different portions of the online conference session. In some embodiments, the current master presenter may select another participant to become the master participant. Additionally or alternatively, a participant could request to become the master presenter.

In some embodiments, the server application 160 may maintain a list of master presenter priority or designate one or more back up master presenters and may automatically shift the role of master presenter if needed. For example, if the current master presenter loses connectivity or exits the online conference session, the server application 160 may automatically identify a new master presenter and shift the role accordingly. If the master presenter changes during an online conference session, the process may be automatic and continuous, such that no breaks or gaps are perceptible in the online conference session. Moreover, if the master presenter changes without the current master presenter endpoint exiting the online conference session, the previous master presenter endpoint may simply become an assistant presenter (described in more detail below) or a viewer/attendee of the online conference session. In embodiments where the master presenter is prevented from sharing content (perhaps to simplify the master presenter experience), the master presenter must become an assistant presenter in order to share content during the online conference. In these embodiments, the master presenter plays the role of director or coordinator, directing/coordinating how the assistant presenters collaborate and explaining the scenario to all meeting attendees. Regardless of the ability of the master presenter to share content, in most embodiments, there will be no more than one master presenter in an online meeting (although there may be any number of assistant presenters sharing content).

At step 220, one or more assistant presenters are determined or identified. Each of the assistant presenters may share content that is accessible from their computing devices and/or currently displayed on the display of their computing devices. The master presenter may organize or control a layout in which the shared content from any number of assistant presenters is displayed, as is described in further detail below. In some embodiments, an endpoint may request to be an assistant presenter by sending a command to the server application, perhaps in response to a participant actuating a button or control included in that endpoint's user interface. Additionally or alternatively, a master presenter may select an endpoint to serve as an assistant presenter, which may cause the server to identify that endpoint as an assistant presenter. Moreover, in some embodiments, a master presenter may control which endpoints are currently designated as assistant presenters and may accept or decline requests to become an assistant presenter, remove an assistant presenter designation, or otherwise send commands to the server to allow the server to determine the assistant presenters.

Notably, in at least some embodiments, an assistant presenter does not view the content shared by other participants. Instead, the assistant presenter shares his/her desktop or application to the server, which aggregates this content with any other content to be shared (and viewed by viewers/attendees) based on commands received from the master user interface. Moreover, an assistant presenter may not have control over whether the content he/she intends to share is actually shared, as discretion over which content is shared may rest with the server and master presenter. If an assistant presenter is currently sharing content, the assistant presenter may be referred to as an active assistant presenter. If an assistant presenter is not currently sharing content, the assistant presenter may be referred to as a passive or standby assistant presenter.

As mentioned with regards to the master presenter, roles (e.g., master presenter and assistant presenter) may shift during an online conference session. Thus, an endpoint determined to be an assistant presenter at one portion of an online conference session may not be determined to be an assistant presenter during another portion of the online conference session. For example, a master presenter may switch roles with an assistant presenter at any point. When an endpoint in an online conference session is not acting as a master presenter or an assistant presenter, the endpoint may be referred to as a non-presenting endpoint, a viewer, or an attendee.

At step 230, a master user interface is generated and provided to the identified master presenter. The master user interface provides controls that allow the master presenter to move, scale, rotate, crop, close, and/or otherwise manipulate content being shared in the online conference session. As an example, in some embodiments, the master user interface may provide the shared content from each presenting endpoint (including one or more assistant presenters and/or a master presenter) in its own manipulable window or subscreen. Then, the participant associated with the master presenter endpoint may resize, move, or close the windows in the same manner that programs may be moved or manipulated on conventional computers and any of these movements may generate commands that instruct the server how to adjust the layout of shared content. Additionally or alternatively, the master user interface may include clickable templates (e.g., four equal sized windows), manipulation tools (e.g., a movement tool, rotation tool, and sizing tool), or any other controls for manipulation. Still further, the master user interface may also include a participant list that provides controls which allow the master presenter to designate or remove certain participants as assistant presenters, designate assistant presenters as active or passive, or simply view the participants currently involved in the online conference session. For example, each participant in the online conference session may be listed in a list of participants together with a checkbox that can be toggled to designate users as assistant presenters and/or active assistant presenters.

In some embodiments, the master user interface may also allow the master presenter endpoint to directly operate on assistant presenter endpoints. For example, the participant associated with the master presenter endpoint could select a certain window associated with a particular endpoint from within the master user interface and scroll, drag-and-drop text, or otherwise manipulate the content being shared from that particular assistant presenter endpoint. In some embodiments, this functionality may also enable the master presenter to communicate privately with the assistant presenter (e.g., through instant messaging) during the online conference session. In some embodiments, the master user interface may only allow the participant associated with the master presenter endpoint to directly operate the endpoints associated with an assistant presenter when the window or sub-screen for that assistant presenter satisfies size requirements or thresholds. An example embodiment of a master presenter remotely operating an assistant presenter's endpoint is described in further detail below with respect to FIG. 6.

At step 240, commands generated at the master user interface are received at the server application. The commands may designate a layout to aggregate content from one or more of the assistant presenters in a manner that is viewable at the plurality of endpoints participating in the online conference session. For example, the layout may arrange slides from one assistant presenter on half of the screen and provide images from two other assistant presenters on the other half of the screen (a quarter of a screen for each image). In some embodiments, the layout may also aggregate content shared by the master presenter together with content shared by any number of assistant presenters. Generally, the layout is a virtual buffer stored in the server 102. The buffer may be automatically, adaptively updated as shared content is added or removed from the sharing layout and may also be manually updated as commands are received from the master user interface. The buffer is transmitted to any viewing endpoints and the master presenter endpoints as it is updated. A more detailed explanation of the aggregation process is provided below with respect to FIG. 3.

Figure 3:
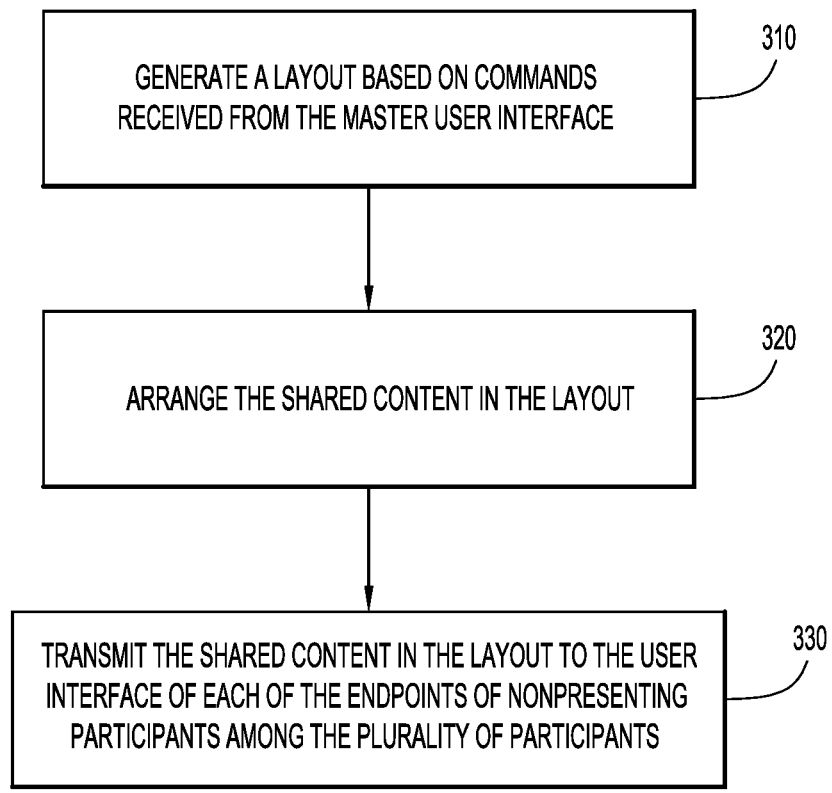
FIG. 3 is a flowchart illustrating a process for generating and transmitting a layout with aggregated shared content from multiple participants of an online conference session, according to an example embodiment.

Reference is now made to FIG. 3 (with continued reference to FIG. 1 and FIG. 2) for a description of a method 300 for aggregating shared content from multiple endpoints during an online conference session, such as performed by execution of software instructions included in the aggregation module 162. At step 310, a layout for shared content is generated and/or updated based on the commands generated at the master user interface. As mentioned, the layout is a virtual buffer stored in the server 102 that can be automatically, adaptively updated and/or manually updated. For example, if the master user interface generates commands to provide a layout with three equally-sized windows, the layout is updated accordingly. Additionally or alternatively, as additional endpoints are added to the layout, the layout may automatically update to a layout that was previously used for the specific endpoints currently sharing or the specific number of endpoints currently sharing. Similarly, as the number of endpoints sharing content is reduced, the layout may be adaptively, automatically adjusted. In some embodiments, the automatic adjustments may adjust the shared content so that each endpoint's shared content is as large as possible ("largest-possible"). However, the adaptive nature of the automatic adjustments may also allow for learning that moves away from the "largest-possible" adjustments over time.

At step 320, shared content is arranged into the layout. The commands received from the master user interface may specify which content is to be placed into which window or sub-screen. Additionally or alternatively, shared content may be automatically removed if a presenter leaves or is disconnected from the online conference session. At step 330, content from multiple endpoints is transmitted, in the layout, to any participants viewing the online conference sessions (e.g., participants that are not presenting) in a single data stream. The data stream including the shared content arranged in the layout may also be transmitted to the master user interface of the master presenter to provide the master presenter with an up-to-date and manipulable view of the current layout and shared content. Consequently, any commands generated at the master user interface may cause the layout to be updated in real-time (at steps 310, 320, and 330). Notably, since transmitting involves sharing a virtual buffer stored in meeting server, the resolution of the shared content does not depend on the computing characteristics of the specific master presenter endpoints. Moreover, when the master presenter role is shifted between participants, joint sharing resolution does not change. If desired, shared content from multiple participants could be scaled to fit width, fit screen, or in the center in local meeting client, but such a selection would have no impact on the buffer stored in the server 102.

Figure 4:
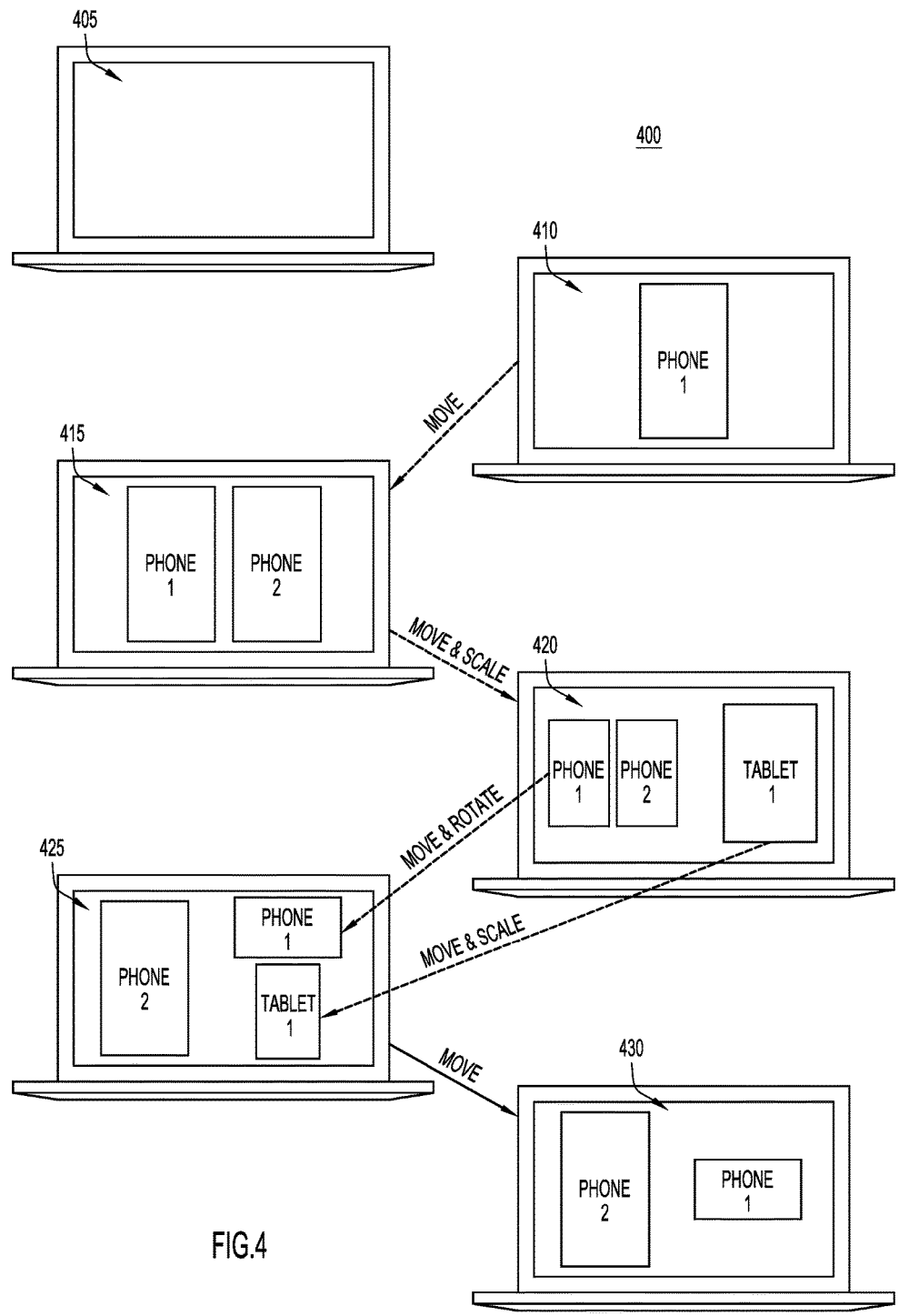
FIG. 4 is a diagram depicting an example master user interface for a master presenter of an online conference session, according to an example embodiment.

Now referring to FIG. 4 for a description of a diagram 400 illustrating automatic and manual layout changes from the perspective of the master presenter. In other words, the diagram 400 depicts different screen shots of the master user interface during an online conference session. Initially, at 405, the master presenter is identified and a blank screen is provided. Then, as assistant presenters join the online conference session (or are otherwise identified or determined) at 410, 415, and 420, the layout may be automatically updated in an adaptive manner to accommodate content from the devices/endpoints of each of these assistant presenters. More specifically, at 410 Phone 1 (e.g., a SmartPhone) is determined to be an assistant presenter and the content displayed on the phone is shared at a central location on the master user interface (and, thus, seen by viewers in the same manner). Then, at step 420, a second endpoint, Phone 2, is determined to be an assistant presenter and the master user interface is automatically updated to accommodate the content from both devices. At 420, a third endpoint, Tablet 1, is determined to be an assistant presenter and the master user interface is again automatically updated by moving and scaling the content from Phone 1 and Phone 2 to accommodate the content from Tablet 1. Notably, at 420, the content from Phone 1 and Phone 2 is moved and scaled in order to provide contrast between content shared from a phone and content shared from a tablet. In some embodiments, predetermined settings may, at least initially, automatically adjust the size of shared content to provide contrast based on the size of an endpoint's display; however, in other embodiments, shared content may be automatically moved, scaled, or otherwise manipulated in any manner as additional content is added to the layout of shared content (e.g., as additional endpoints share content simultaneously).

At 425, the layout is manually modified to adjust the size, orientation, and location of the shared content: Phone 1 is rotated ninety degrees and moved to the top right corner; Tablet 1 is scaled smaller and moved to the bottom right corner; and Phone 2 is scaled larger and moved to the left side of the layout. As mentioned, these manipulations may be performed with any desirable controls or techniques. Regardless, when commands are received from the master user interface, the server may update, modify, or generate a layout accordingly. As the online conference session continues, the layout may be updated automatically and/or manually. For example, at 430 shared content from Tablet 1 is removed from the layout and the content from Phone 1 is moved into a centered position on the right side. In some embodiments, the content from Tablet 1 may be automatically removed if Tablet 1 is determined to no longer be an assistant presenter and/or no longer sharing content. Alternatively, the master presenter may remove the content being shared by Tablet 1 from the layout. Either way, the content from phone 1 may be moved manually or automatically.

Figure 5A:
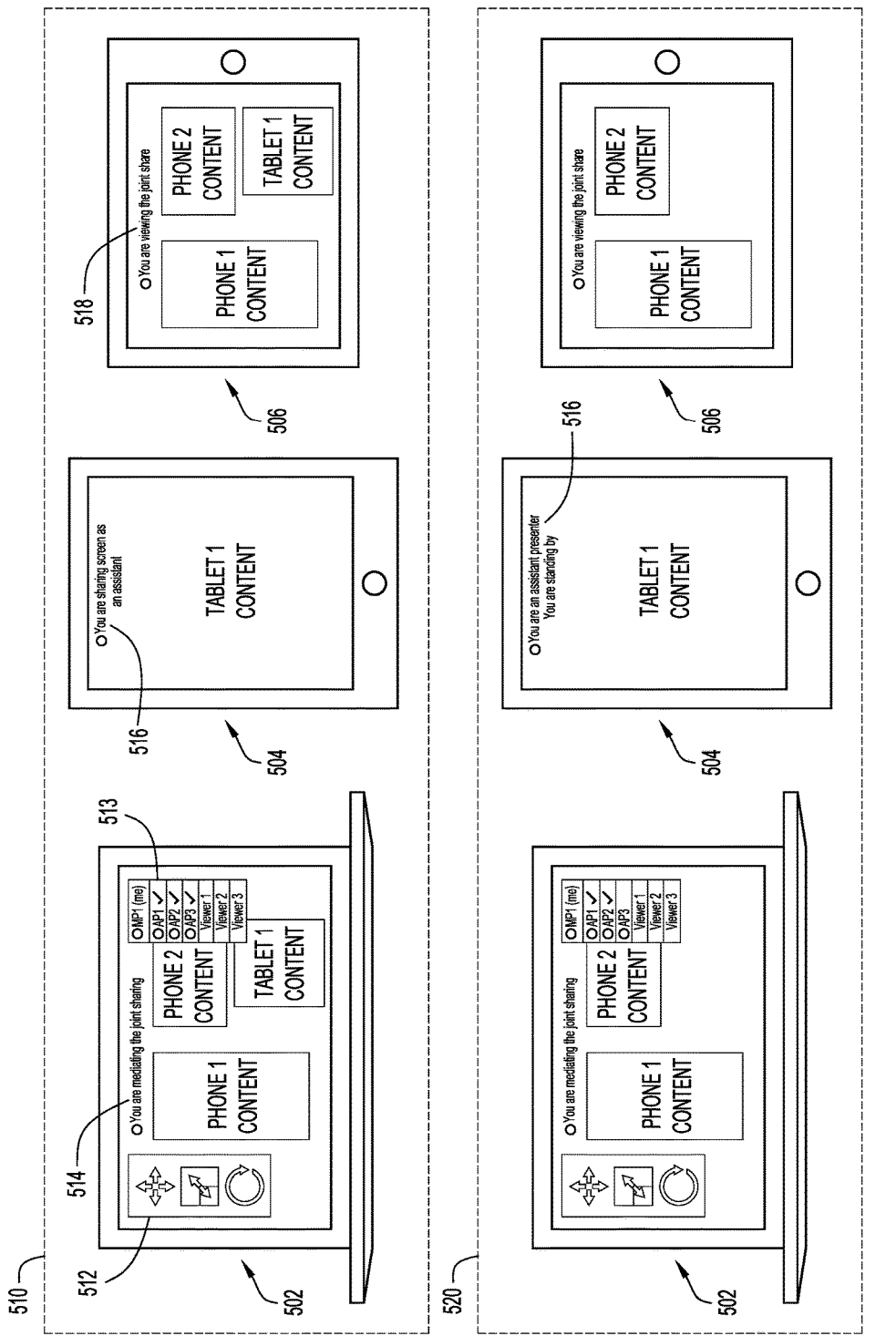
FIG. 5A and FIG. 5B are diagrams depicting example user interfaces for participants of an online conference session in which content is being shared from multiple endpoints, according to example embodiments.
Figure 5B:
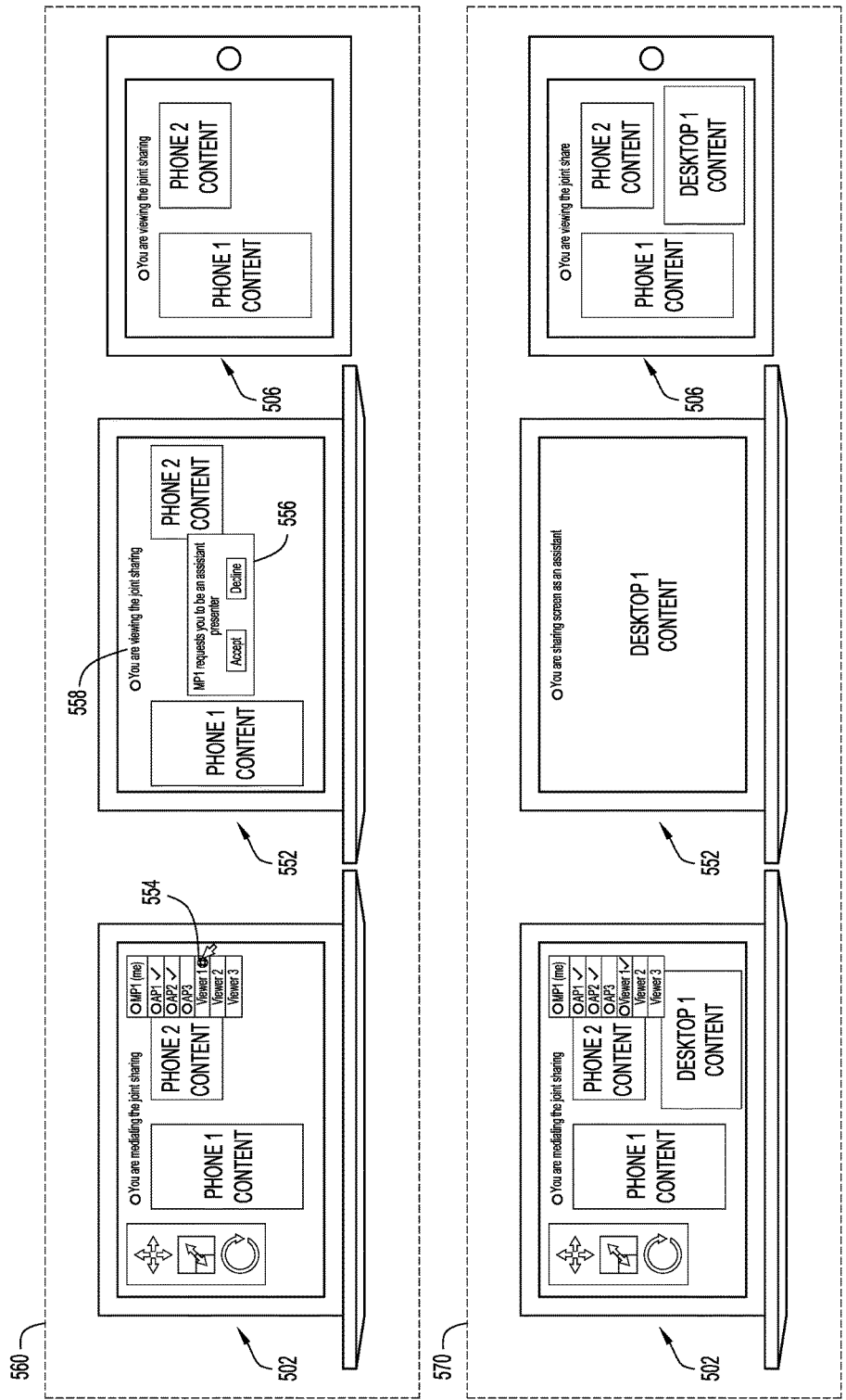

Now referring to FIG. 5A and FIG. 5B for a description of diagrams 500 and 550, which illustrate screen shots of user interfaces during an online conference session, according to an example embodiment. Each of diagrams 500 and 550 illustrates user interfaces of a master presenter endpoint 502 and a viewer endpoint 506 during different portions of an online conference session. Additionally diagram 500 includes an assistant presenter endpoint 504 while diagram 550 includes a viewer endpoint 552.

First referring to FIG. 5A, at 510, three assistant presenters (Phone 1, Phone 2, and Tablet 1) are simultaneously sharing content (although only one assistant presenter is illustrated). Consequently, the master presenter endpoint 504 includes three windows, each displaying content from one of the assistant presenters. The viewer endpoint 506 displays the same layout; however, since the viewer endpoint 506 cannot manipulate the content windows in any manner, the viewer endpoint 506 displays the shared content from the assistant presenters without any controls, such as control panel 512 and participant list 513. The control panel 512 includes various controls to allow the master presenter to input commands regarding the layout of the shared content (e.g., resize, move, reorient, etc.) while the participant list 513 allows the master presenter to input commands regarding which participants should be determined to be assistant presenters. In this particular embodiment, the controls 512 include tools for moving, resizing, and rotating shared content while the participant list 513 includes icons to the left of assistant participants (AP1, AP2, and AP3) and check marks to the right of those participants that are currently sharing content (AP1, AP2, and AP3). Moreover, in this embodiment, the controls 512 are included along a first edge of the user interface and the participant list 513 is included in the top right of the display. In other embodiments, the controls 512 and participant list 513 may each be individually movable (e.g., drag-and-drop) and may simply sit atop of the adjustable content layout.

In order to ensure the user interfaces provide clear indications of a participant's current role, each user interface may provide an indication of the user's role. For example, master presenter endpoint 504 includes an indicator 514 that provides "You are mediating the joint sharing" while the viewing endpoint 506 includes an indicator 518 that provides "You are viewing the joint sharing." By comparison, the assistant presenter endpoint 504 only displays the content that the assistant presenter is sharing (in this instance, the content displayed on Tablet 1) and indicator 516 either provides "You are sharing as an assistant" (as seen at 510) or "You are an assistant presenter, you are standing by" (as seen at 520).

At 520, the content displayed on the assistant presenter endpoint 504 (Table 1 Content) is removed from the sharing layout (either automatically or in response to commands input at the master user interface). Consequently, the indicator 516 now provides "You are an assistant presenter, you are standing by." In other words, the assistant presenter endpoint 504 has not been removed from the list of assistant presenters or otherwise relieved of this role; instead, the content displayed at the assistant presenter endpoint 504 is simply not being shared at this moment and the assistant presenter endpoint 504 can be considered a passive or stand-by presenter. Accordingly, the checkmark that was included in participant list 513 next to AP3 no longer appears. If instead, the master presenter wanted to relieve assistant presenter endpoint 504 of its role as an assistant presenter, the master presenter could click the icon on the left of AP3. If removed from its role as an assistant presenter, the endpoint 504 would need to request to become a presenter again or accept a new request from the master presenter. By comparison, the master presenter may toggle presenters between active and passive in order to turn sharing on or off at any time. In other words, passive assistant presenters are essentially on mute. In fact, in some embodiments, an assistant presenter may designate themselves as passive in order to pause their screen sharing.

Now referring to FIG. 5B, at 560, a viewer endpoint 552 is invited to transition to a role as an assistant presenter. In this embodiment, the master presenter simply clicks a box or icon 554 adjacent the viewer's name in the participant list 513. This sends a command to the server to invite viewer endpoint 552 to act as an assistant participant, which in turn, causes the server to issue a prompt 556 to the viewer endpoint 552 to determine if the viewer endpoint 552 wishes to become an assistant presenter. Notably, during this process, the indicator 558 at the viewer endpoint provides "You are viewing the joint sharing" until the viewer makes a selection on the prompt 556. Additionally, during this process, other viewing endpoints, such as viewing endpoint 506, will continue to display shared content without interruption.

At 570, the user interfaces illustrate the displayed content on each endpoint subsequent to the viewer endpoint 552 accepting the offer to become an assistant presenter. Consequently, viewer endpoint 506 and master presenter endpoint 502 now include content from viewer endpoint 552 (Desktop 1 Content), a check appears next to Viewer1 in the participant list 513, and indicator 558 now provides "You are sharing screen as an assistant." In this embodiment, the content from endpoint 552 is sized, oriented, and located in the same manner that the content from assistant presenter 516 had been displayed. In some embodiments, new content may automatically be arranged in the same manner as recently removed content in order to facilitate easy and efficient transitions. However, in other embodiments, the content from endpoint 552 could be sized, oriented, and located in any desirable manner.

Still referring to FIGS. 5A and 5B, in some embodiments, a participant (e.g., a viewer) may request to share content, as opposed to being requested to share (as shown at 560). In different embodiments, there may be different procedures for requesting to share content. For example, depending on whether other participants are currently sharing content, a participant may be able to request to become the master presenter or another assistant presenter. Regardless, in some embodiments, once a request is submitted, the request may be automatically approved and content from the requesting participant may be shared. However, in other embodiments, a master presenter may be given an opportunity to review the request. Upon review, the master presenter may authorize the requesting participant to become an assistant presenter or, alternatively, the master presenter may pass the master presenter designation to the requesting participant. However, in some embodiments, becoming the master presenter may not enable the requesting participant to share content (e.g., those embodiments where the master presenter is a coordinator and cannot share content). In these embodiments, if another participant is already sharing, a requesting participant may only request to become an assistant presenter to share content (as the master presenter cannot present simultaneously to another endpoint in these embodiments).

As participants switch the master presenter, move between roles as standby presenters and active presenters (e.g., presenters sharing content), and otherwise move between different roles provided by the techniques presented herein, there are multiple indicators to clarify what role a user is currently in and what content is being shared. Initially, each user interface includes an indicator (e.g., indicators 514, 516, 518, and 558) that provides a description of the role that a participant is currently in (e.g., you are sharing, viewing, standing-by, etc.). Moreover, in some embodiments, a role name may be placed in a predetermined portion, such as a corner, of each user interface and shared window. For example, the top-left corner of each user interface may include one of the following designations: MP (Master presenter); AP1, AP2 . . . APX (assistant presenter 1, 2 . . . X) or Viewer 1, 2 . . . X. The shared windows seen on the master user interface and the displays of any viewer may also include these designations. Moreover, shared content from a particular endpoint may be surrounded with a border in order to provide clear delineation between content from different endpoints. Still further, in most embodiments, there is only one master presenter at any one time. Since the master user interface includes various controls, and the assistant presenter interface presents a single screen, a participant will be able to easily determine their role based on the presence of controls (master presenter) or a lack of multiple windows (assistant presenter).

Now referring to FIG. 6 for a description of a sequence chart 600 illustrating a sequence for adding content and manipulating the content from the perspective of the master presenter. Initially, at step 602, the master presenter clicks on AP1 (Assistant Presenter 1) in a participant list in order to request AP1 to share content. This generates a command that is sent to the meeting server. In response to receiving the command, the meeting server requests the AP1 to share at 604. At 606, the AP1 accepts the request and, at 608, AP1 begins sharing content. At 610, a joint sharing buffer (e.g., the layout) is updated to include content shared from AP1. The updated joint sharing buffer is transmitted to viewers at 612 and to the master presenter at 614. Consequently, the content displayed for viewers is updated at 616 and the content displayed for the master presenter is updated at 618. Up to this point, any steps in the sequence have been automatically processed. For example, the content from AP1 was automatically added to the layout. Subsequently, the master presenter can adjust the layout, thereby manually adjusting the layout of the displayed shared content.

In the particular embodiment depicted in FIG. 6, the master presenter is operating directly on the assistant presenter's endpoint in order to adjust the content displayed via sharing. Consequently, at step 620, the master presenter remotely accesses the content being shared from AP2's endpoint and scrolls half way up the screen. Since this command is routed through meeting server, the scroll is initially transmitted to the meeting server at 620. Then, the meeting server transmits the command to AP2 at 622, causing the endpoint to scroll accordingly at 624. At 626, the scrolling content is shared with the meeting server, which updates the joint sharing buffer (the aforementioned virtual buffer) accordingly at 628. The updated joint sharing buffer is transmitted to viewers at 630 and to the master presenter at 634. Consequently, the content displayed for viewers is updated at 632 and the content displayed for the master presenter is updated at 636.

There are several advantages to the techniques presented herein. As one example, the techniques presented herein allow content to be easily and efficiently simultaneously shared from multiple endpoints. As a more specific example, the techniques presented herein support both automatic, adaptive layouts and manual layouts setting, thereby easing the burden on the coordinator to continuously reorient and resize shared content while also allowing for any size and orientation corrections or adjustments. These techniques also provide added security and control by allowing one participant to control which participants can share content and which content is shared. As another example, since the techniques provided herein are implemented at a server, the shared content is broadcast in a single data flow, thereby reducing computing bottlenecks that cause unwanted interruptions during online conferences.

To summarize, in one form, a method is provided comprising: at a server having network connectivity, identifying a master presenter at an endpoint among a plurality of endpoints participating in an online conference session in which at least one of the plurality of endpoints is sharing content with other participants among the plurality of participants at their respective endpoints; determining one or more assistant presenters among the plurality of participants at their respective endpoints; generating a master user interface to serve as the user interface on the endpoint of the master presenter; and receiving, via the master user interface, a command to designate a layout that aggregates shared content from the endpoints of one or more of the assistant presenters to make the layout viewable at the plurality of endpoints.

In another form, an apparatus is provided comprising: a network interface unit configured to enable network connectivity; and a processor coupled to the network interface unit and configured to: identify a master presenter at an endpoint among a plurality of endpoints participating in an online conference session in which at least one of the plurality of endpoints is sharing content with other participants among the plurality of participants at their respective endpoints; determine one or more assistant presenters among the plurality of participants at their respective endpoints; generate a master user interface to serve as the user interface on the endpoint of the master presenter; and receive, via the master user interface, a command to designate a layout that aggregates shared content from the endpoints of one or more of the assistant presenters to make the layout viewable at the plurality of endpoints.

In yet another form, a non-transitory computer-readable storage media is provided encoded with software comprising computer executable instructions and when the software is executed operable to: identify a master presenter at an endpoint among a plurality of endpoints participating in an online conference session in which at least one of the plurality of endpoints is sharing content with other participants among the plurality of participants at their respective endpoints; determine one or more assistant presenters among the plurality of participants at their respective endpoints; generate a master user interface to serve as the user interface on the endpoint of the master presenter; and receive, via the master user interface, a command to designate a layout that aggregates shared content from the endpoints of one or more of the assistant presenters to make the layout viewable at the plurality of endpoints.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a server having network connectivity, identifying a master presenter at an endpoint among a plurality of endpoints participating in an online conference session in which at least one of the plurality of endpoints is sharing content with other participants among a plurality of participants at their respective endpoints;
   generating a master user interface to serve as a user interface on the endpoint of the master presenter;
   automatically determining one or more assistant presenters among the plurality of participants at their respective endpoints based on input received via the master user interface of the endpoint of the master presenter;
   receiving, via the master user interface, a command from the master presenter that designates a customized layout selected by the master presenter that aggregates shared content from one or more endpoints of the one or more assistant presenters;
   automatically arranging the shared content in the customized layout;
   automatically transmitting the shared content in the customized layout to each non-presenting endpoint among the plurality of endpoints in a single data stream; and
   enabling the master presenter to operate directly on a particular endpoint of the one or more endpoints of the one or more assistant presenters via the master user interface so that the master presenter can adjust the shared content from a particular assistant presenter.

2. The method of claim 1, further comprising:
   automatically updating the customized layout to remove content from the endpoint of the one or more assistant presenters no longer participating in the online conference session or no longer determined to be one of the one or more assistant presenters.

3. The method of claim 1, further comprising:
   indicating, in a participant list, each participant that is associated with an endpoint that is determined to be an assistant presenter.

4. The method of claim 1, further comprising:
   receiving, via the master user interface of the endpoint of the master presenter, a command for a size, a shape, and a location of the shared content from each of the one or more assistant presenters.

5. The method of claim 1, further comprising:
   receiving, via the master user interface of the endpoint of the master presenter, a command to restrict at least one of: an amount of shared content shown on a virtual screen and a number of assistant presenters that may share content on the virtual screen.

6. The method of claim 1, further comprising:
   identifying a new master presenter at a new endpoint that is different from the endpoint; and
   transferring the master user interface from the endpoint to the new endpoint.

7. The method of claim 1, wherein the enabling further comprises:
   enabling the master presenter to communicate privately with the particular assistant presenter.

8. An apparatus comprising:
   a network interface unit configured to enable network connectivity; and
   a hardware processor coupled to the network interface unit and configured to:
   identify a master presenter at an endpoint among a plurality of endpoints participating in an online conference session in which at least one of the plurality of endpoints is sharing content with other participants among a plurality of participants at their respective endpoints;
   generate a master user interface to serve as a user interface on the endpoint of the master presenter;
   automatically determine one or more assistant presenters among the plurality of participants at their respective endpoints based on input received via the master user interface of the endpoint of the master presenter;
   receive, via the master user interface, a command from the master presenter that designates a customized layout selected by the master presenter that aggregates shared content from one or more endpoints of the one or more assistant presenters;
   automatically arrange the shared content in the customized layout;
   automatically transmit the shared content in the customized layout to each non-presenting endpoint among the plurality of endpoints in a single data stream enable the master presenter to operate directly on a particular endpoint of the one or more endpoints of the one or more assistant presenters via the master user interface so that the master presenter can adjust the shared content from a particular assistant presenter.

9. The apparatus of claim 8, wherein the processor is further configured to:
automatically update the customized layout to remove content from the endpoint of the one or more assistant presenters no longer participating in the online conference session or no longer determined to be one of the one or more assistant presenters.

10. The apparatus of claim 8, wherein the processor is further configured to:
indicate, in a participant list, each participant that is associated with an endpoint that is determined to be an assistant presenter.

11. The apparatus of claim 8, wherein the processor is further configured to:
receive, via the master user interface of the endpoint of the master presenter, a command for a size, a shape, and a location of the shared content from each of the one or more assistant presenters.

12. The apparatus of claim 8, wherein the processor is further configured to:
receive, via the master user interface of the endpoint of the master presenter, a command to restrict at least one of: an amount of shared content shown on a virtual screen and a number of assistant presenters that may share content on the virtual screen.

13. The apparatus of claim 8, wherein the processor is further configured to:
identify a new master presenter at a new endpoint that is different from the endpoint; and
transfer the master user interface from the endpoint to the new endpoint.

14. The apparatus of claim 8, wherein in enabling the master presenter to operate directly on the particular endpoint of the particular assistant presenter via the master user interface to enable, the processor is further configured to:
enable the master presenter to communicate privately with the particular assistant presenter.

15. A non-transitory computer-readable storage media encoded with software comprising computer executable instructions and when the software is executed operable to:
identify a master presenter at an endpoint among a plurality of endpoints participating in an online conference session in which at least one of the plurality of endpoints is sharing content with other participants among a plurality of participants at their respective endpoints;
generate a master user interface to serve as a user interface on the endpoint of the master presenter;
automatically determine one or more assistant presenters among the plurality of participants at their respective endpoints based on input received via the master user interface of the endpoint of the master presenter;
receive, via the master user interface, a command from the master presenter that designates a customized layout selected by the master presenter that aggregates shared content from one or more endpoints of the one or more assistant presenters;
automatically arrange the shared content in the customized layout;
automatically transmit the shared content in the customized layout to each non-presenting endpoint among the plurality of endpoints in a single data stream; and
enable the master presenter to operate directly on a particular endpoint of the one or more endpoints of the one or more assistant presenters via the master user interface so that the master presenter can adjust the shared content from a particular assistant presenter.

16. The non-transitory computer-readable storage media of claim 15, further comprising instructions operable to:
automatically update the customized layout to remove content from the endpoint of the one or more assistant presenters no longer participating in the online conference session or no longer determined to be one of the one or more assistant presenters.

17. The non-transitory computer-readable storage media of claim 15, further comprising instructions operable to:
indicate, in a participant list, each participant that is associated with an endpoint that is determined to be an assistant presenter.

18. The non-transitory computer-readable storage media of claim 15, further comprising instructions operable to:
receive, via the master user interface of the endpoint of the master presenter, a command for a size, a shape, and a location of the shared content from each of the one or more assistant presenters.

19. The non-transitory computer-readable storage media of claim 15, further comprising instructions operable to:
identify a new master presenter at a new endpoint that is different from the endpoint; and
transfer the master user interface from the endpoint to the new endpoint.

20. The non-transitory computer-readable storage media of claim 15, wherein the instructions enabling the master presenter to operate directly on the particular endpoint of the particular assistant presenter via the master user interface further comprise instructions operable to:
enable the master presenter to communicate privately with the particular assistant presenter.

* * * * *